United States Patent [19]
Kim

[11] Patent Number: 5,793,575
[45] Date of Patent: Aug. 11, 1998

[54] ROTARY TRANSFORMER FOR A VIDEO CASSETTE RECORDER HAVING A STATOR AND A ROTOR EQUIPPED WITH COILS

[75] Inventor: Keum-Mo Kim, Seoul, Rep. of Korea

[73] Assignee: Daewoo Electronics Co., Ltd., Rep. of Korea

[21] Appl. No.: 777,448

[22] Filed: Dec. 30, 1996

[30] Foreign Application Priority Data

Dec. 29, 1995 [KR] Rep. of Korea ............ 95-62749

[51] Int. Cl.$^6$ .................... G11B 5/52; G11B 5/02
[52] U.S. Cl. ............... 360/108; 360/130.24; 336/182
[58] Field of Search ................ 360/108, 130.24; 336/173, 182; 318/254, 138

[56] References Cited

U.S. PATENT DOCUMENTS

| | | | |
|---|---|---|---|
| 4,031,558 | 6/1977 | Kusaka | 360/108 |
| 4,232,922 | 11/1980 | Teass, Jr. | 339/5 R |
| 5,359,312 | 10/1994 | Choi | 336/84 |

FOREIGN PATENT DOCUMENTS

| | | | |
|---|---|---|---|
| 62-134816 | 6/1987 | Japan | 360/130.24 |
| 2-177114 | 7/1990 | Japan | 360/130.24 |
| 4-318302 | 11/1992 | Japan | 360/130.24 |
| 878261 | 9/1961 | United Kingdom | |
| 95/06939 | 3/1995 | WIPO | |

Primary Examiner—Stuart S. Levy
Assistant Examiner—Kevin M. Watkins

[57] ABSTRACT

A rotary of a head drum assembly for a VCT in which the structure thereof is simple, thereby facilitating the manufacture thereof, and which can prevent cross-talk of the video signals by forming magnetic conjunctions only between corresponding rotor and stator coils. The rotary transformer comprises a transformer stator having a stator body which is mounted on a lower drum of the head drum assembly and has at least two stator channels formed on a surface thereof, and stator coils respectively wound and attached in the stator channels, and a transformer rotor having rotor bodies which are mounted on an upper drum of the head drum assembly and have recesses formed on opposite surfaces thereof, and rotor coils respectively wound on the rotor bodies, the rotor bodies being substantially I-shaped and being disposed spaced apart from the stator channels by a distance, the rotor coils being electrically connected to magnetic heads respectively. The stator body has an annular disc-shape on a hollow cylindrical shape. The transformer rotor further comprises connecting members, each of which has a flat portion to which a rotor body is attached, a pair of shield portions for shielding magnetic fields, and at least one mounting portion.

10 Claims, 4 Drawing Sheets

ROTARY TRANSFORMER FOR A VIDEO CASSETTE RECORDER HAVING A STATOR AND A ROTOR EQUIPPED WITH COILS

BACKGROUND OF THE INVENTION

1. Field of the Invention

The present invention relates to a head drum assembly for a video cassette recorder, and more particularly to a rotary transformer of a head drum assembly for a video cassette recorder.

2. Description of the Prior Art

Generally a video cassette recorder (hereinafter, referred to as a (VCR) is a device for recording and reproducing video and audio signals on and from a magnetic tape running by a tape running system of the VCR. The VCR records and reproduces the video signals as its magnetic heads make contact with the magnetic tape, while a head drum of the VCR is rotating. The magnetic heads are electrically connected to a signal processing system of the VCR through a rotary transformer so that the video signals are transferred from the head to the signal processing system and vice versa.

FIG. 1 schematically shows a conventional head drum assembly of a VCR, and FIG. 2 shows the structure of the rotary transformer of the head drum assembly of FIG. 1.

With reference to FIGS. 1 and 2, the head drum assembly includes a lower drum 10 mounted on a base plate (not shown) of the VCR, and an upper drum 20 on which magnetic heads 22 are mounted. A motor 30 is mounted on lower drum 10 below lower drum 10.

Motor 30 has a stator 30A and a rotor 30B, and rotor 30B is rotated in magnetic conjunction with stator 30A, if a current is applied to stator 30A. Upper drum 20 is fixed to an upper portion of a shaft 32 by a flange 34, and rotor 30B is fixed to a lower portion of shaft 32. Shaft 32 is inserted into a bearing housing integrally formed with lower drum 10. So, if a current is applied to motor 30, rotor 30B of motor 30 is rotated, and hence shaft 32 and upper drum 20 are rotated together.

Several magnetic heads 22, generally two or four, are mounted on upper drum 20. Two magnetic heads 22, as shown in FIG. 1, are mounted on upper drum 20, and are circumferentially spaced apart from each other by 180 degrees.

A rotary transformer 50 is provided to transfer the video signals to and from magnetic heads 22 at a position between lower and upper drums 10 and 20. Rotary transformer 50 comprises a transformer stator 60 and a rotor 70, which are respectively mounted on lower and upper drums 10 and 20.

Transformer stator 60 comprises a stator body 60A and coils 64 (hereinafter, referred to as stator coils), and is electrically connected to a recording and reproducing signal processing system (not shown) of the VCR through stator coils 64.

Transformer rotor 70 comprises a rotor body 70A, and coils 74 (hereinafter, referred to as rotor coils) wound on rotor body 70A. Rotor body 70A is mounted on upper drum 20, spaced apart from stator body 60A by a minute gap, and is electrically connected to magnetic heads 22 by rotor coils 74. During the recording and reproducing operation of the VCR, transformer rotor 70 rotates together with upper drum 20.

Stator body 60A has an annular disc-shape, on the upper surface of which two channels 62 (hereinafter, referred to as stator channels) are concentrically disposed. Stator coils 64 are respectively wound and bonded in stator channels 62 and are electrically connected to the signal processing system of the VCR.

Rotor body 70A also has an annular disc-shape and has two channels 72 (hereinafter, referred to as rotor channels) concentrically disposed on the lower surface thereof at radial positions opposite to the radial positions of stator channels 62. Rotor coils 74 are respectively wound and bonded in rotor channels 72 and are electrically connected to corresponding magnetic heads 22 by soldering or the like.

Hereinafter, the signal recording and reproducing operation of the conventional head drum assembly will be explained.

In order to record the video signals on the magnetic tape of the VCR, the recording signal processing system (not shown) transfers video signals to the stator coils 64 in the form of current magnitude changes. As the current magnitudes of the stator coils 64 are changed, electromotive forces are generated in the corresponding rotor coils 74. Namely, whenever the current magnitudes of stator coils 64 are changed, the magnetic fluxes flowing in the directions perpendicular to the cross sections of rotor coils 74 are changed, thereby generating electromotive forces in rotor coils 74 so that the video signals are transferred from transformer stator 60 to transformer rotor 70.

The signals transferred to transformer rotor 70 are transferred to magnetic heads 22 electrically connected to rotor coils 74. The signals sent to magnetic heads 22 are recorded on the magnetic tape of the VCR when heads 22 make contact with the magnetic tape while upper drum 20 is rotating.

In order to reproduce the video signals from the magnetic tape, magnetic heads 22 mounted on upper drum 20 make contact with the magnetic tape and reads the video signals from the magnetic tape while upper drum 30 is rotating. The signals change magnitudes of the currents flowing through rotor coils 74. The current magnitude changes of rotor coils 70 generate electromotive forces in stator coils 64, and thus change the current magnitudes of stator coils 64. As a result, the signals red by magnetic heads 22 are transferred through rotary transformer 50 to the reproducing signal processing system. The signal processing system reproduces video signals from magnetic heads 22 by using the current magnitude changes.

In the conventional head drum assembly, however, it is difficult to form the channels on the surfaces of the stator and the rotor bodies because the spaced distances between the channels are very small, and it is also difficult to constantly maintain the gap between the channels. Therefore, the manufacturing and assembling costs of the head drum assembly are increased. In addition, the conventional head drum assembly has a disadvantage in that unintended electromotive forces can be generated in adjacent coils, not in the corresponding coils, thereby generating cross-talk in the signals.

Furthermore, in a conventional had drum assembly with four magnetic heads, there should be four channels respectively formed on rotor and stator bodies, each having an annular disc-shape. However, the spaced distances between channels are so small that it is even more difficult to form the channels on the annular discs in the conventional head drum assembly with four heads, and more unintended electromotive forces can be generated in adjacent coils.

U.S. Pat. No. 5,359,312 issued to Young C. Choi on Sep. 25, 1994 discloses a rotary transformer wherein shield walls and circular slots are respectively formed on rotor and stator bodies, which have annular disc-shapes, between adjacent channels to reduce the above-mentioned unintended electromotive forces. However, the distance between the adjacent channels is so small that it is not easy to form the walls and slots on the bodies. Further, the complicated structure of the rotary transformer increases manufacturing cost of the transformer.

SUMMARY OF THE INVENTION

Therefore, it is an object of the present invention to provide a rotary transformer in which manufacturing and assembling coasts thereof can be reduced due to a simple structure thereof, and which can prevent cross-talks of video signals, which are unintended effects of magnetic fields.

In order to achieve the object of the present invention, there is provided a rotary transformer of a head drum assembly for a VCR which comprises a transformer stator having a stator body which is mounted on a lower drum of the head drum assembly and has at least two stator channels are formed on a surface thereof, and stator coils respectively wound and attached in the stator channels; and a transformer rotor having rotor bodies which are mounted on an upper drum of the head drum assembly and have recesses on opposite surfaces thereof, and rotor coils respectively wound on the rotor bodies, the rotor bodies being substantially L-shaped and being spaced apart from the stator channels by a distance, the rotor coils being electrically connected to magnetic heads respectively.

According to one aspect of the present invention, the stator body is substantially annular disc-shaped, a lower surface of the stator body being mounted on the lower drum of the head drum assembly, the stator channels being concentrically disposed on an upper surface of the stator body and being radially spaced apart from an adjacent channel respectively, the transformer rotor further comprising connecting members for mounting the rotor bodies on the upper drum.

According to another aspect of the present invention, the stator body is a substantially hollow cylindrical shape, an inner surface of the stator body being fitted with a bearing housing of the head drum assembly, the stator body being mounted on the lower drum of the head drum assembly, the stator channel being disposed on an outer surface of the stator body and being spaced apart from an adjacent channel along a length of stator body respectively, the transformer rotor further comprising connecting members for mounting the rotor bodies on the upper drum.

According to the present invention, each of the connecting bodies has a flat portion to which one of the rotor bodies is attached, a pair of shield portions respectively extending from a pair of opposite edges of the flat portion, for covering the rotor coils, and at least mounting portion extending from another pair of opposite edges of the flat portion, for mounting the connecting members on the upper drum, the shield portions being perpendicular to the flat portion, each of the mounting portions having a through-hole for inserting a screw.

According to the present invention, the connecting members are comprised of steel, and cross sections thereof are U-shaped.

In the rotary transformer according to the present invention, the shape and structure of the transformer rotor is simple, so it is easy to manufacture the rotary transformer. Further, the transformer rotor can be easily mounted on the upper drum, and the gap between the rotors and the transformer stator can be accurately maintained. Further, the arrangements of the stator channels and the transformer rotor, and the size of the gap between the rotors and the transformer stator can be easily altered.

In addition, according to the present invention, cross-talk which cause noises in video signals of a VCR can be prevented by forming magnetic conjunctions between rotor coils and the corresponding stator coils by the connecting members.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE PREFERRED EMBODIMENTS

Hereinafter, the preferred embodiments of the present invention will be described in detail with reference to the accompanying drawings.

Figure 1:
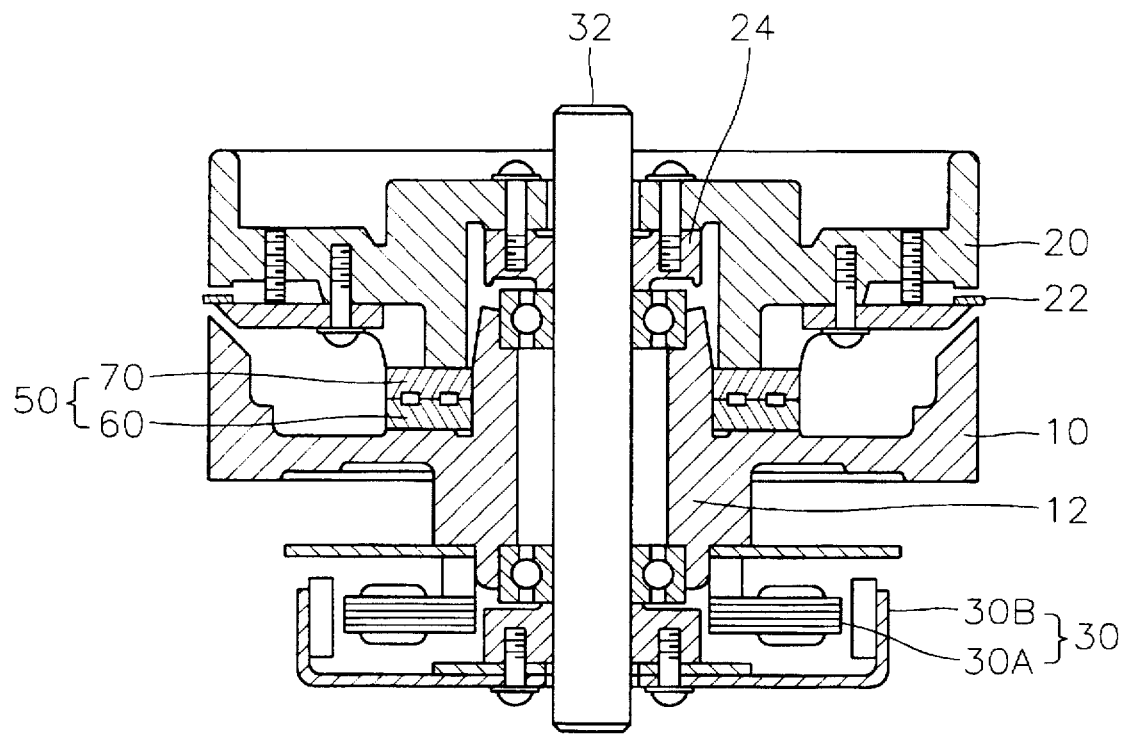
FIG. 1 is a cross sectional view for showing a conventional head drum assembly of the VCR.
Figure 2:
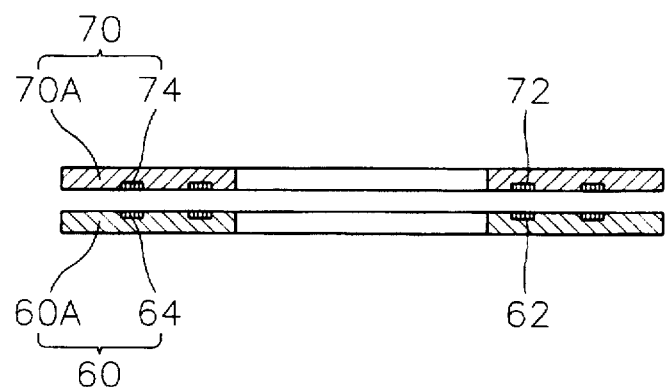
FIG. 2 is an enlarged sectional view for showing the rotary transformer of the head drum assembly of FIG. 1.
Figure 3:
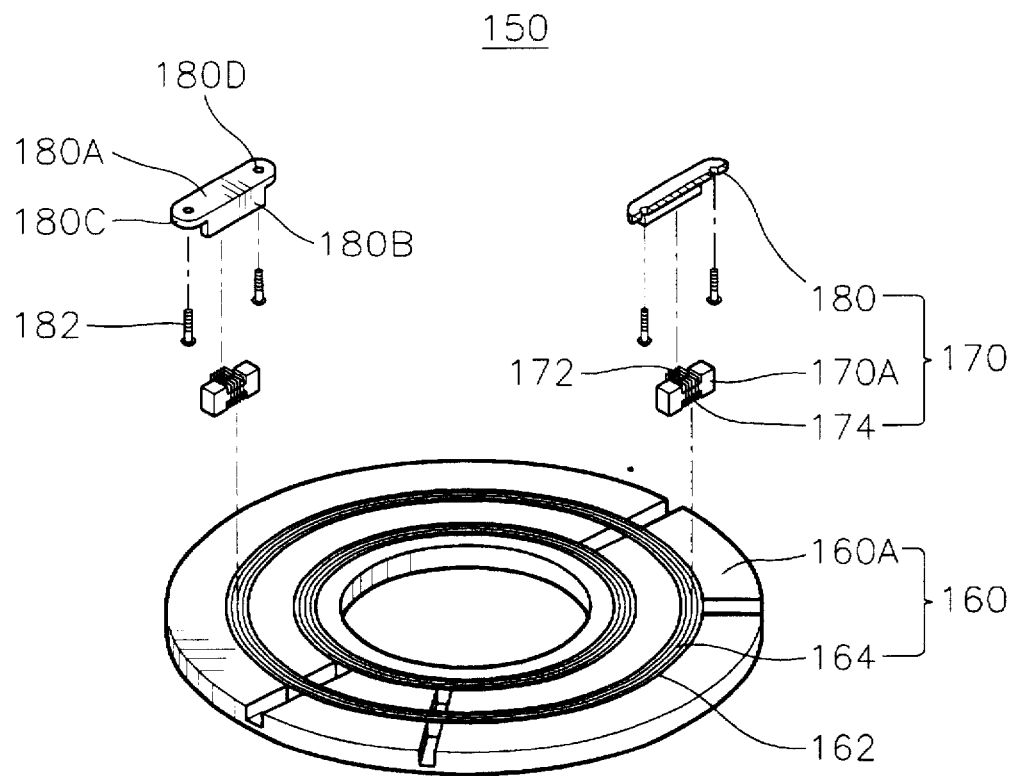
FIG. 3 is an exploded perspective view for showing a rotary transformer according to the first embodiment of the present invention.

FIG. 3 shows a rotary transformer according to the first embodiment of the present invention.

With reference to FIG. 3, a rotary transformer 150 comprises a transformer stator 160 and a transformer rotor 170. Transformer stator 160 comprises a stator body 16A and coils 164 (hereinafter, referred to as stator coils) wound on stator body 160. Transformer rotor 170 comprises rotor bodies 170A, coils 174 (hereinafter, referred to as rotor coils) respectively wound on rotor bodies 170A, and connecting members 180.

Figure 4:
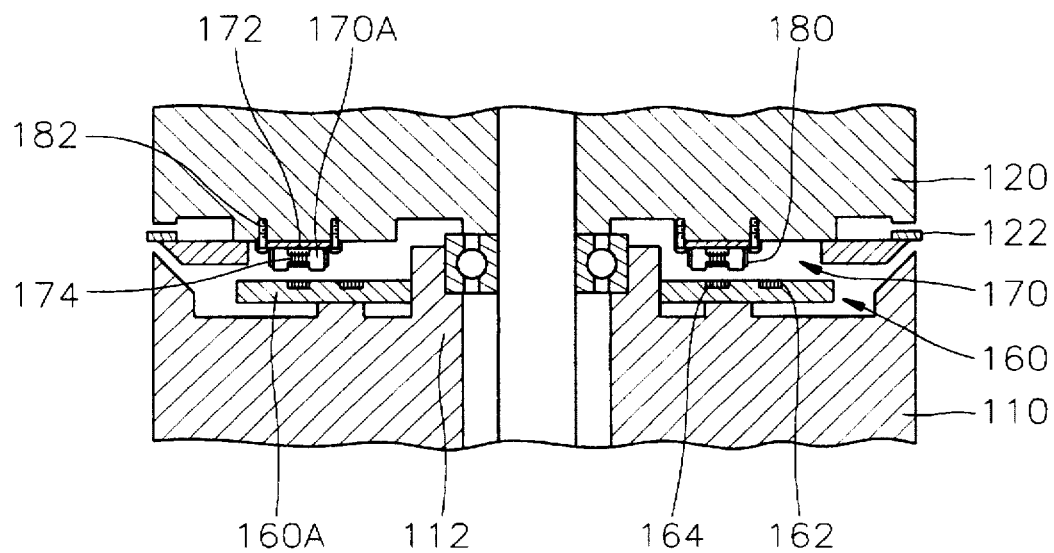
FIG. 4 is an exploded cross sectional view for showing the mounting state of the rotor transformer of FIG. 3 on a head drum assembly.

Stator body 160 is substantially annular disc-shaped, and has an upper surface and a lower surface. Two channels 162 are formed on the upper surface of stator 160. Channels 162 are circular grooves having U-shaped cross sections, are concentrically disposed on the upper surface of stator 160, and are radially spaced apart by a predetermined distance. Stator coils 164 are respectively wound in channels 162 and are attached to stator bodies 16A by a binder. As shown in FIG. 4, transformer stator 160 is mounted on lower drum 110, and is electrically connected through stator coil 164 to a signal processing system (not shown) of the VCR.

Recesses 172 are respectively formed on the upper and lower surfaces of rotor bodies 170A so that each of rotor bodies 170A has a substantially horizontal I-shape. Rotary transformer 150 according to the first embodiment of the present invention is provided with two rotor bodies 170A, and rotor coils 174 are respectively wound in recesses 172 formed on rotor bodies 170A. Rotor bodies 170A are mounted on lower surfaces of upper drum 120, facing the stator body 160A, and are circumferentially spaced apart by 180 degrees Rotor bodies 170A are mounted on upper drum 120 by connecting members 180.

Each of connecting members 180 is formed by bending opposite sides of a rectangular plate by ninety degree, and thus has a substantially inversed U-shape which has a flat portion 180A and a pair of shield portions 180B. Shield portions 180B extend from opposite edges of flat portion 180A and are perpendicular to flat portion 180A. Rotor bodies 170A are respectively attached by a binder to flat portion 180A. Mounting portions 180C, which respectively project from edges of connecting members 180, are integrally formed at both length-wise ends of the length of connecting member 180. Mounting portions 180C are rectangular plates, and the direction of mounting portions 180C is the same as that of flat portion 180A. In each of connecting members 180, through-holes 180D for inserting screws to mount a connecting member 180 on upper drum 120 are formed in mounting portions 180C. As shown in FIG. 3, flat portion 180A, shield portions 180B, and mounting portions 180C are integrally formed.

FIG. 4 shows a mounting state of the rotary transformer of FIG. 3 on a head drum assembly.

With reference to FIGS. 3 and 4, stator body 160A is fitted in an inner surface of a bearing 112, and the lower end thereof is mounted on a lower drum 110. Stator coils 164 are electrically connected to a recording and reproducing processing system (not shown).

Connecting members 180 are mounted by screws 182 on upper drum 120 by inserting screws 182 into through-holes 180D formed in mounting portions 180C, and are circumferentially spaced apart from each other by 180 degree. Each of rotor bodies 170A is attached to flat portion 180A of connecting member 180 by a binder so that one of its recesses is opposite to a corresponding stator channel 172. Rotor coils 174 are electrically connected to magnetic heads 122 by soldering or the like.

The width of each of shield portions 180B is determined to be sufficiently large enough to cover rotor coils 174 so that magnetic fields formed by rotor coils 174, which are wound in rotor bodies 170A attached to connecting members 180, cannot effect stator coils 164, which do not correspond to rotor coils 174. Namely, due to the existence of shield portions 180B, the magnetic fields affect only corresponding stator coils 164. Connecting members 180 are manufactured by steel plates, to effectively shield the magnetic fields.

Hereinafter, the operation of the rotary transformer according to the first embodiment of the present invention will be explained.

In order to record the video signals of the VCR, when the signals are transferred from the recording signal processing system of the VCR, the current magnitudes flowing through stator coils 164 are changed, thereby generating magnetic fields around coils 164. As a result, the magnetic fluxes perpendicular to the cross section of rotor coils 174 corresponding to stator coils 164 changes, thereby generating electromotive forces in rotor coils 174. The electro-motive forces cause the current magnitudes of rotor coils 174 to be changed, which are then transferred as signals to magnetic heads 122 electrically connected to rotor coils 174. The signals, while upper drum 120 of the head drum assembly is rotating, are recorded on the magnetic tape (not shown) making contact with magnetic heads 122.

In order to reproduce the video signals of the magnetic tape of the VCR, the video signals are transferred to magnetic heads 122, while magnetic heads 122 are in contact with the magnetic tape. Then, the magnitudes of rotor coils 174 electrically connected to magnetic heads 122 are changed, thereby generating electromotive forces in stator coils 164 corresponding to rotor coils 174. The current magnitudes flowing through stator coils 164 are changed by the electromotive forces, and the changes of stator coils 164 are transferred to the reproducing signal processing system electrically connected to stator coils 164. The video signals are transferred to a display device through the reproducing signal processing system in order to reproduce and display the signals.

In the recording and reproducing operation mode, shield portions 180B of connecting members 180 shield the magnetic fields generated from rotor coils 174 so that the magnetic inductions are generated only between rotor coils 174 and stator coils 164 corresponding to rotor coils 174. Namely, the magnetic fields of rotor coils 174 do not seriously affect stator coils 164 which do not correspond to rotor coils 174. Therefore, rotary transformer 150 according to the present invention prevents unintended electromotive forces between adjacent rotor or stator coils 164 and 174, and thus prevent cross-talks of signals.

Further, the U-shaped cross sections of connecting members 180 prevent deformations of connecting members 180 due to bending moments generated in connecting members 180 during the rotation of upper drum 120. As a result, even while upper drum 120 is rotating, spaced gaps between rotor bodies 170A and stator bodies 160A are uniformly maintained.

Figure 5:
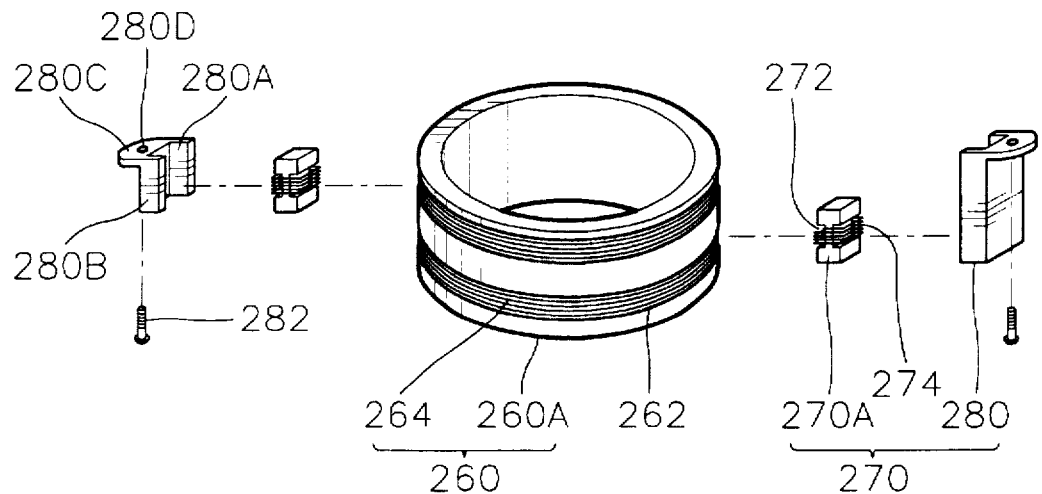
FIG. 5 is an exploded perspective view for showing a rotary transformer according to the second embodiment of the present invention.

FIG. 5 shows a rotary transformer 250 of a head drum assembly of a VCR, according to the second embodiment of the present invention.

With reference to FIG. 5, rotary transformer 250 includes a transformer stator 260 and transformer rotor 270. Transformer stator 260 comprises stator body 260A and coils 264 (hereinafter, referred to as stator coils) wound on stator body 260A. Transformer rotor 270 comprises rotor bodies 270A and coils 274 (hereinafter, referred to as rotor coils) wound on rotor bodies 274.

The stator body 260A has a hollow cylindrical shape having outer and inner surfaces, and channels 262 (hereinafter, referred to as stator channels 261) are formed on the outer surface of stator body 160A. Stator channels 262 are disposed on the surface, and are spaced apart by a distance along the length of stator body 260A. Stator coils 264 are respectively wound in stator channels 262 and are attached to stator body 260A by a binder.

Each of rotor bodies 270A is substantially I-shaped, and recesses 270 for winding rotor coils 274 are respectively formed on opposite side surfaces thereof rotor coils 274 are respectively wound in recesses 270 of rotor bodies 270A and are electrically connected to the corresponding magnetic heads 222.

Connecting members 280 are made by bending the opposite sides of a rectangular plate, along its width, so as to have a substantially U-shaped cross section, and thus has a flat portion 280A and shield portions 280B. Shield portions 280B extend from opposite edges of flat portion 280A and are formed so that it is perpendicular to flat portion 280A. In each of connecting members 280, as shown in FIG. 5, a mounting portion 280C is integrally formed with flat portion 280A at one edge of flat portion 280A. Mounting portion 280C has a rectangular shape and protrudes from the edge of flat portion 280A in a direction opposite to the bent direction of shield portions 280C. A through-hole 280D for inserting a screw to mount a connecting member 280 on upper drum 220 is formed in mounting portion 280C of each of connecting members 280. As shown in FIG. 5, flat portion 280A, shield portions 280B, and mounting portion 280C of each of connecting members 280 are integrally formed.

The widths of each of shield portions 280B are determined to be sufficiently large enough to cover rotor coils 274 so that magnetic fields formed by rotor coils 274, which are wound in rotor bodies 270A attached to connecting members 280, cannot affect stator coils 264, which do not correspond to rotor coils 274. Namely, due to the existence of shield portions 280B, the magnetic fields affect only the corresponding stator coils 274. Connecting members 280 are manufactured by steel plates, to effectively shield the magnetic fields.

Figure 6:
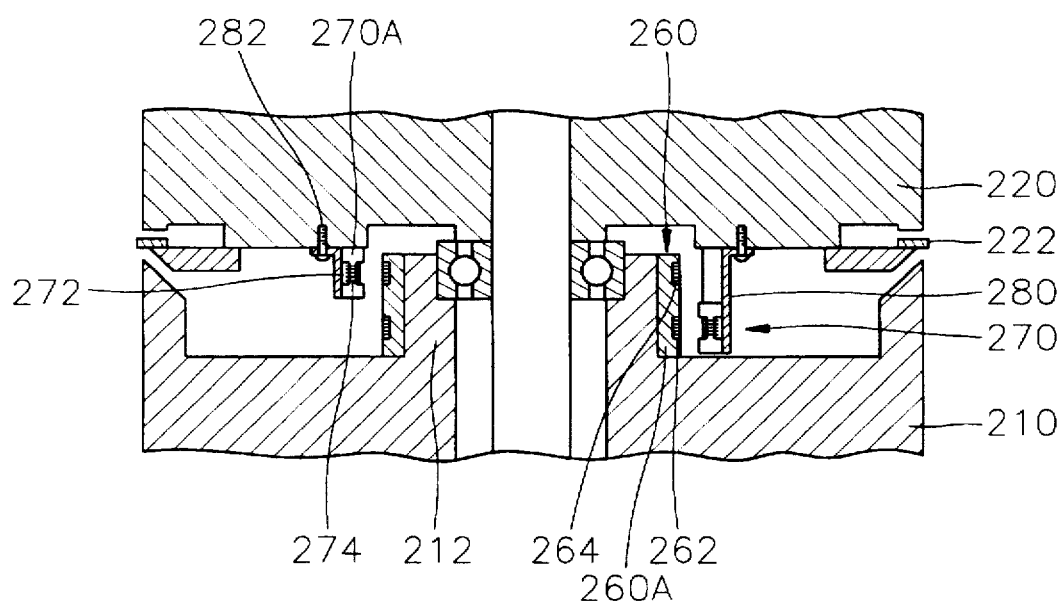
FIG. 6 is an exploded cross sectional view for showing the mounting state of the rotor transformer of FIG. 7 on a head drum assembly.

FIG. 6 shows a mounting state of the rotary transformer of FIG. 5 on a head drum assembly.

With reference to FIGS. 5 and 6, stator body 260A is fitted to a bearing housing integrally formed with lower drum 210. The inner surface and the lower end of stator body 260A are respectively fixed to bearing housing 212 and lower drum 210. Coils 264 are electrically connected to the recording and reproducing processing system of the VCR.

The mounting portions 280C of connecting members 280 are mounted by screws 282 on the lower surface of upper drum 220 and are circumferentially spaced apart from each other. Rotor bodies 270 are respectively attached by a binder to flat portions 280A of connecting members 280, by a binder, so that it is spaced apart from stator body 270A with a distance, and so that one of recesses 272 of each of rotor bodies 270A is opposite to corresponding channel 262 formed in stator body 260A.

Figure 7:
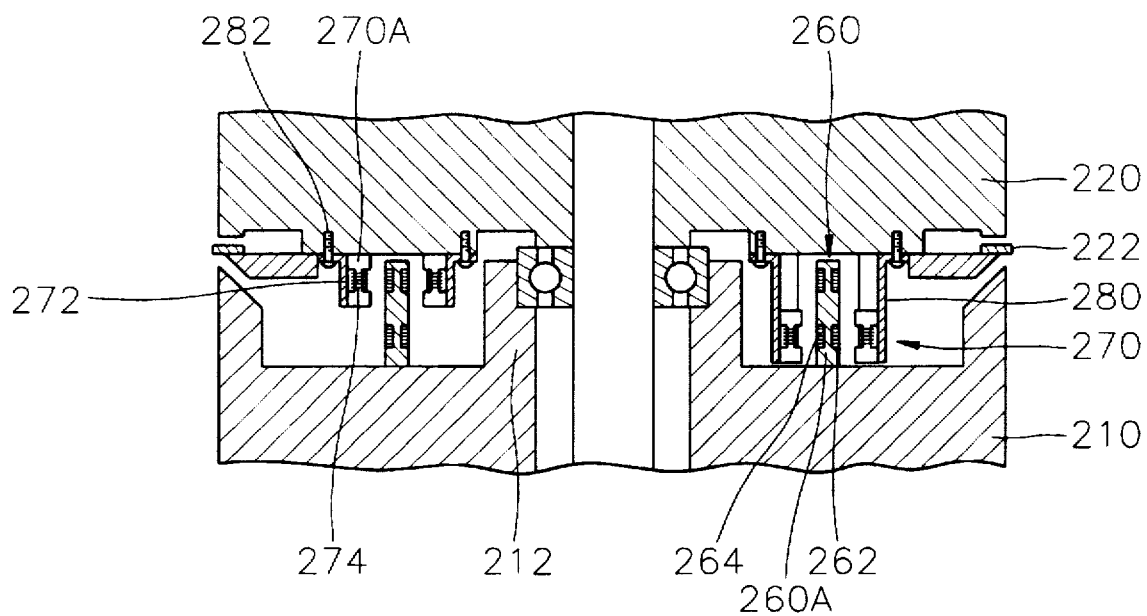
FIG. 7 is an exploded cross sectional view for showing the mounting state of a rotary transformer of a head drum assembly having four heads, according to the second embodiment of the present invention.

FIG. 7 represents an example in which a rotary transformer according to the second embodiment of the present invention is applied to ahead drum assembly having four heads. Four magnetic heads 222 are mounted on an upper drum 220 of the head drum assembly, and are circumferentially spaced apart from adjacent heads 222 by ninety degrees, but only two heads 22 are shown in the figure for convenience.

As shown in FIG. 7, on the inner and outer surfaces of stator body 260A, two stator channels 262 are respectively disposed so that they are spaced apart by a predetermined distance along the length of stator body 260A. Stator coils 264 are respectively wound in stator channels 262 and are attached to stator bodies 260A. Stator coils 264 are electrically connected to the recording and reproducing processing system of the VCR.

Stator body 260A is disposed so that it is concentrically spaced radially apart from the outer surface of bearing housing 212 of the head drum assembly. The lower end of stator body 260A is fixed to lower drum 210 of the assembly.

Two connecting members 280 are provided at the interior and exterior of stator body 260A respectively. Rotor bodies 270 are respectively attached by a binder to flat portions 280A of connecting members 280 so that is spaced apart from stator body 270A with a distance, and so that one of recesses 272 of each of rotor bodies 270A is opposite to the corresponding channel 262 formed in stator body 260A. Namely, rotor bodies 270 are mounted on upper drum 220 so as to be opposite to stator channels 262 formed at upper and lower portions of the inner and outer surfaces of stator body 260B respectively.

As shown in FIG. 7, rotor bodies 270A corresponding to channels 262 formed on an upper portion of the outer surface and a lower portion of the inner surface of stator body 260 are disposed on an identical circumferential position, and rotor bodies 270A corresponding to channels 262 formed on a lower portion of the outer surface and an upper portion of the inner surface of stator body 260 are disposed on an identical opposite circumferential position to the above circumferential position.

Hereinafter, the operation of the rotary transformer according to the second embodiment of the present invention will be explained.

In the recording operation of the VCR, when the signals are transferred from the recording signal processing system of the VCR, the current magnitudes flowing through stator coils 264 are changed, and magnetic fields are generated around coils 264. As a result, the magnetic fluxes perpendicular to the cross sections of rotor coils 274 corresponding to stator coils are changed, and thus electromotive forces are generated in rotor coils 274. The electromotive forces cause the current magnitudes of rotor coils 274 to be changed, which are then transferred to magnetic heads 222 electrically connected to rotor coils 274 as signals. The signals, while upper drum 230 of the head drum assembly is rotating, are recorded on magnetic tape making contact with the magnetic heads 222.

In the reproducing operation of the VCR, the video signals are transferred to magnetic heads 222 while magnetic heads 222 are in contact with the magnetic tape. Then, the magnitudes of rotor coils 274 electrically connected to magnetic heads 222 are changed, thereby generating electromotive forces in stator coils 264 corresponding to rotor coils 274. The current magnitudes flowing through stator coils 264 are changed by the electromotive forces, and the changes of stator coils 264 are transferred to the reproducing signal processing system electrically connected to stator coils 264. The video signals are transferred to a display device through the reproducing signal processing system in order to reproduce and display the signal.

In the recording and reproducing operation mode, shield portions 280B of connecting members 280 shield the magnetic fields generated from rotor coils 274 so that the magnetic inductions are generated only between rotor coils 274 and stator coils 264 corresponding to rotor coils 274. Namely, the magnetic fields of rotor coils 274 do not seriously affect stator coils 264 which do not correspond to rotor coils 274. Therefore, rotary transformer 250 according to the present invention prevents unintended electromotive forces between adjacent rotor or stator coils 264 and 274, thereby preventing cross-talk of signals.

Further, the U-shaped cross sections of connecting members 280 prevent deformations of connecting members 280 due to bending moments generated in connecting members 280 during the rotation of upper drum 220. As a result, even while upper drum 220 is rotating, spaced gaps between rotor bodies 270A and stator bodies 260A are uniformly maintained.

In the rotary transformer according to the present invention, the shape and structure of the transformer rotor is simple, so it is easy to manufacture the rotary transformer. Further, the transformer rotor can be easily mounted on the upper drum, and the gap between the rotors and the transformer stator can be accurately maintained. Further, the arrangements of the stator channels and the transformer rotor, and the size of the gap between the rotors and the transformer stator, can be easily altered.

In addition, according to the present invention, cross-talk which cause noises in video signals of a VCR can be prevented by forming magnetic conjunctions between rotor coils and the corresponding stator coils by the connecting members.

While the present invention has been particularly shown and described with reference to particular embodiments thereof, it will be understood by those skilled in the art that various changes in form and detail may be effected therein without departing from the spirit and scope of the invention as defined by the appended claims.

What is claimed is:

1. A rotary transformer of a head drum assembly for a video cassette recorder comprising:

a transformer stator having a stator body which is mounted on a lower drum of the head drum assembly and has at least two stator channels formed on a surface thereof, and stator coils which are provided in the stator channels;

a transformer rotor having rotor bodies which are mounted on an upper drum of the head drum assembly and have recesses on upper and lower surfaces thereof so that each rotor body has a substantially horizontal I-shape, and rotor coils respectively wound in the recesses of the rotor bodies, the rotor bodies being spaced apart from the stator channels by a distance, the rotor coils being electrically connected to magnetic heads respectively, the rotor coil facing to the stator coil; and connecting members for mounting the rotor bodies on a lower portion of upper drum, each connecting member having a flat portion to which one of the rotor bodies is attached, a pair of shield portions respectively extending downward from both sides of the flat portion to cover the rotor coils for shielding a magnetic field created by the rotor coils, and mounting portions extending from both ends of the flat portion for mounting the connecting members on the lower portion of the upper drum, the shield portions being perpendicular to the flat portion, each of the mounting portions having a through-hole for inserting a screw.

2. A rotary transformer of a head drum assembly for a video cassette recorder according to claim 1, wherein the stator body is substantially annular disc-shaped, a lower surface of the stator body being mounted on the lower drum of the head drum assembly, the stator channels being concentrically disposed on an upper surface of the stator body and being radially spaced apart from an adjacent channel respectively.

3. A rotary transformer of a head drum assembly for a video cassette recorder according to claim 2, wherein the connecting members are comprised of steel.

4. A rotary transformer of a head drum assembly for a video cassette recorder according to claim 2, wherein cross sections of each of the connecting members are substantially U-shaped.

5. A rotary transformer of a head drum assembly for a video cassette recorder according to claim 1, wherein the stator body is a substantially hollow cylindrical shape, an inner surface of the stator body being fitted with a bearing housing of the head drum assembly, the stator body being mounted on the lower drum of the head drum assembly, the stator channels being disposed on an outer surface of the stator body and being spaced apart from an adjacent channel along a length of the stator body respectively.

6. A rotary transformer of a head drum assembly for a video cassette recorder according to claim 5, wherein the connecting members are comprised of steel.

7. A rotary transformer of a head drum assembly for a video cassette recorder according to claim 5, wherein cross sections of the connecting members are substantially U-shaped.

8. A rotary transformer of a head drum assembly for a video cassette recorder according to claim 1, wherein the stator body is a substantially hollow cylindrical shape, an inner surface of the stator body being fitted with a bearing housing of the head drum assembly, the stator body being mounted on the lower drum of the head drum assembly, the stator channels being disposed on an outer surface of the stator body and being spaced apart from an adjacent channel along a length of stator body respectively.

9. A rotary transformer of a head drum assembly for a video cassette recorder according to claim 8, wherein the connecting members are comprised of steel.

10. A rotary transformer of a head drum assembly for a video cassette recorder according to claim 8, wherein cross sections of the connecting members are substantially U-shaped.

* * * * *